United States Patent [19]

Brogårdh et al.

[11] Patent Number: 4,569,570
[45] Date of Patent: Feb. 11, 1986

[54] OPTICAL SENSOR HAVING ATOMICALLY LOCALIZED LUMINESCENCE CENTERS

[75] Inventors: Torgny Brogårdh; Bertil Hök; Christer Ovren, all of Västerås, Sweden

[73] Assignee: ASEA Aktiebolag, Västerås, Sweden

[21] Appl. No.: 498,477

[22] Filed: May 26, 1983

[30] Foreign Application Priority Data

May 27, 1982 [SE] Sweden ............................ 8203297

[51] Int. Cl.$^4$ ............................................. G02B 6/00
[52] U.S. Cl. ............................... 350/96.34; 350/96.1; 252/301.16; 250/486.1; 372/40; 372/41
[58] Field of Search ............... 252/301.16; 250/485.1, 250/486.1; 350/96.29, 96.30, 96.1, 96.34; 372/40, 41

[56] References Cited

U.S. PATENT DOCUMENTS

| 3,725,811 | 4/1973 | Murphy | 372/41 |
| 3,935,119 | 1/1976 | Barber et al. | 252/301.4 F |
| 4,149,083 | 4/1979 | Suys et al. | 250/486 |

FOREIGN PATENT DOCUMENTS 2064107   6/1981   United Kingdom ............ 250/458.1

*Primary Examiner*—John Lee
*Assistant Examiner*—Lester Rushin, III
*Attorney, Agent, or Firm*—Watson, Cole, Grindle & Watson

[57] ABSTRACT

An optical sensor for detecting changes in physical quantities such as temperature, position, force, level, pressure, flow, acceleration, magnetic or electrical field strength or mechanical deformation, includes a luminescent material built up of atomically localized luminescence centers, included as a solid solution in an amorphous or mono-crystalline bonding material.

7 Claims, 17 Drawing Figures

FIG. 4
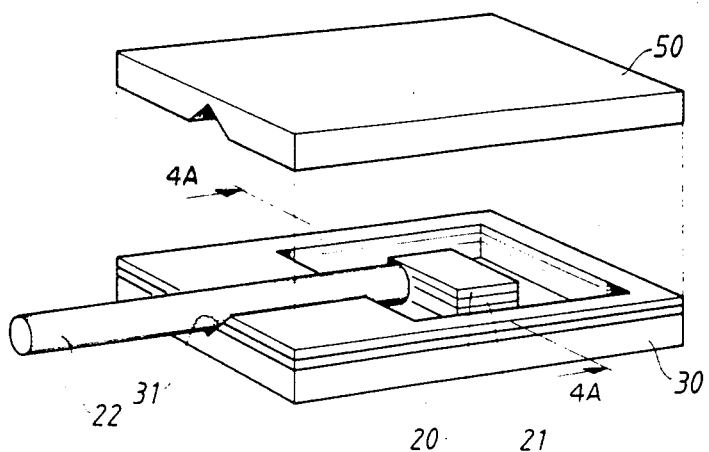
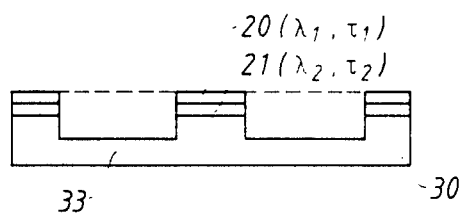
FIG. 4A

OPTICAL SENSOR HAVING ATOMICALLY LOCALIZED LUMINESCENCE CENTERS

TECHNICAL FIELD

The present invention relates to an optical sensor for detecting changes in a physical quantity such as temperature, position, force, level, pressure, flow, acceleration, magnetic field strength, electrical field strength, mechanical deformation, etc., which sensor comprises at least one luminescent material, which upon optical excitation emits light of a wavelength different from that of the excitation light.

The invention is particularly concerned with an improved luminescent material for use in a wide range of optical sensors, which material gives advantages over those used heretofore. One such anticipated advantage is a higher luminescence yield compared with the yield obtainable with conventional phosphorescent substances.

It should be understood that the references to "light" herein should be taken to include the infrared and ultraviolet regions of the electromagnetic spectrum and not just the visible spectrum.

Optical sensors of the kind described above have so far all had certain limitations with respect to mechanical design and manufacturing technique, temperature properties, and the possibilities for time or frequency division of the signal information using standard electronic components.

SUMMARY OF THE INVENTION

An optical sensor according to the invention is characterized in that the luminescent material thereof is built up of atomically localized luminescence centers forming a solid solution in an amorphous or mono-crystalline bonding material.

OBJECTS AND ADVANTAGES OF THE INVENTION

One object of the invention is thus to provide a fiber optical sensor for measuring a physical quantity which is based on new sensor designs for luminescence from a class of materials which has previously not been used in this connection. The luminescent material consists of atomically localized luminescence centers which form a solid solution in an amorphous or mono-crystalline bonding material, for example ions of neodymium or some other rare earth metal can form a solid solution in glass or some crystalline material, for example yttrium-aluminium-garnet (YAG). Using such a luminescent material in a sensor results in advantages with respect to the mechanical design of, and the technique used to manufacture the sensor, the temperature properties of the sensor, the possibilities for time or frequency division of the signal information by means of standard electronic components, as well as the improved luminescence yield compared with conventional phosphor materials.

More specifically, the invention gives the following advantages:

1. The luminescence properties are primarily determined by the luminescence centers (e.g. metal ions), whereas it is the bonding material which determines the mechanical and chemical properties of the sensor. This gives greater freedom in the mechanical design of the sensor and the choice of manufacturing method for fabricating it.

2. The intensity, wavelength and optical time constant of the luminescence can be given a very good temperature stability (see Thornton et al, Appl. Opt. 8 (1969) 1087-1102) over a relatively large temperature range or with a temperature dependence controlled through the concentration of the luminescence centers in the bonding material. (Asawa, Robinson Phys, Rev. (1966) 251-258.)

3. The time constant of the luminescence can be of the order of magnitude of hundreds of microseconds, which makes possible time or frequency division of the signal information by means of standard electronic components.

4. Because the luminescent centers are included as a solid solution in the bonding material, which may either have amorphous or mono-crystalline structure, losses due to scattering and reflection are avoided which otherwise occur in phosphor material having a polycrystalline structure or in suspensions.

BRIEF DESCRIPTION OF DRAWINGS

The invention will now be further described, by way of example, with reference to the accompanying drawings, in which:

FIGS. 1 to 7 show seven different embodiments of sensor according to the invention, FIGS. 2 to 5 being position sensors, FIG. 6 a sensor for measuring a magnetic or electrical field or a mechanical deformation and FIG. 7 a sensor for detecting a threshold temperature at a specific location;

DESCRIPTION OF PREFERRED EMBODIMENTS

Figure 1:
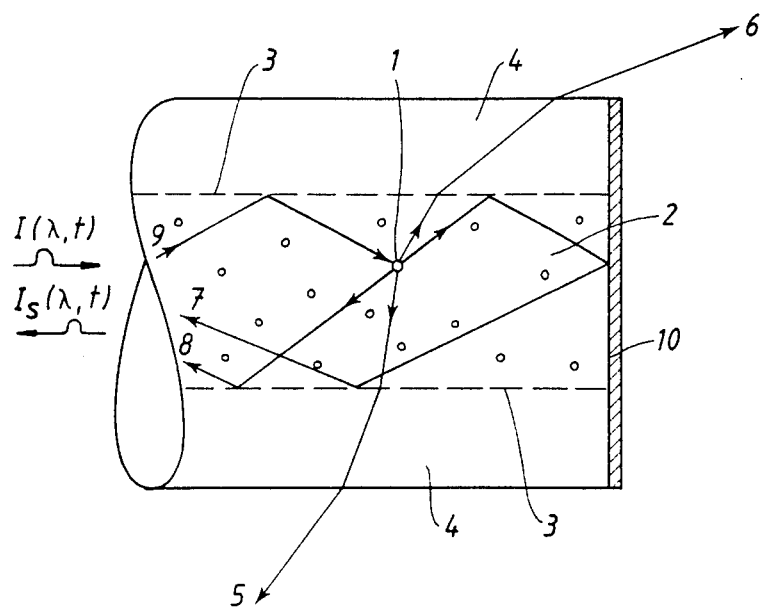
Figure 1A:
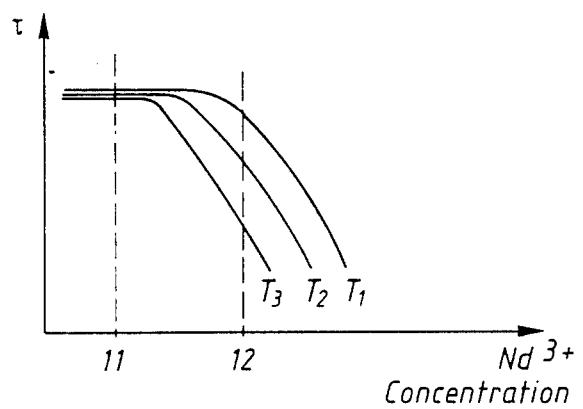
FIG. 1A shows the time constant/concentration curve for one type of sensor material usable in the sensor of FIG. 1.

FIG. 1 shows one end of a sensor (shaped like an optical fiber) excited by incoming optical energy, characterized by the intensity I (t, $\lambda$; a function of time t and wavelength $\lambda$). The optical fiber has totally reflecting intermediate surface(s) 3 formed at the junction between a sheath 4 and a core 2 of the fiber, the sheath 4 being made of a material having a lower refractive index than the material of the core 2. The core 2 comprises atomically localized luminescence centers 1, at which the excitation light I is absorbed and reemitted. The luminesence centers 1 are included as a solid solution in the bonding material of the core 2. On excitation of a luminescence center 1 (e.g. by a light ray 9), luminescent light is emitted in all directions, whereby part of the luminescent light is lost from the sensor into the environment (exemplified in FIG. 1 by the rays 5 and 6) whereas other parts are retained within the sensor and returned back along the fiber (rays 7 and 8). A reflecting coating 10 on the end surface of the fiber increases the intensity of the returned light by preventing losses through the fiber end. The luminescence light is characterized by its intensity $I_s(t,\lambda)$, the function-dependent part of which is dependent on $I(t,\lambda)$ as well as on the transmission properties for the sensor. In the embodiment given, the following is obtained $$I(t,\lambda) = \begin{cases} I_0(\lambda) & t < 0 \\ 0 & t > 0 \end{cases}$$

$$I_s(t,\lambda) = I(\lambda) \times e^{-\frac{t}{\tau}} \quad t > 0$$

where $\tau$ is defined as the optical time constant of the sensor material. FIG. 1A shows how the time constant varies with the concentration of neodymium ions and with the temperature, exemplified by the family of characteristics at the three different temperatures $T_1$, $T_2$, $T_3$. By choosing a suitable value (say 12) of the ion concentration, $\tau$ can be seen to be strongly temperature dependent in the interval $T_1$, $T_3$ whereas at a lower ion concentration (say 11) the time constant varies far less with temperature changes. Thus, by operating in a strongly temperature dependent part of the characteristic and monitoring the time decay of the luminescent light, it is thus, under certain conditions, possible to measure the temperature.

Figure 2:
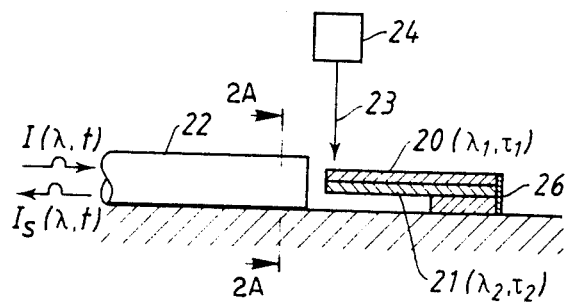
Figures 2A, 2B:
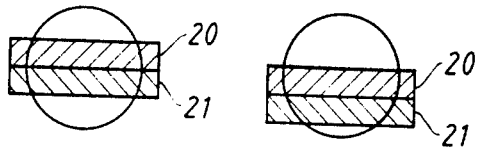
Figure 3:
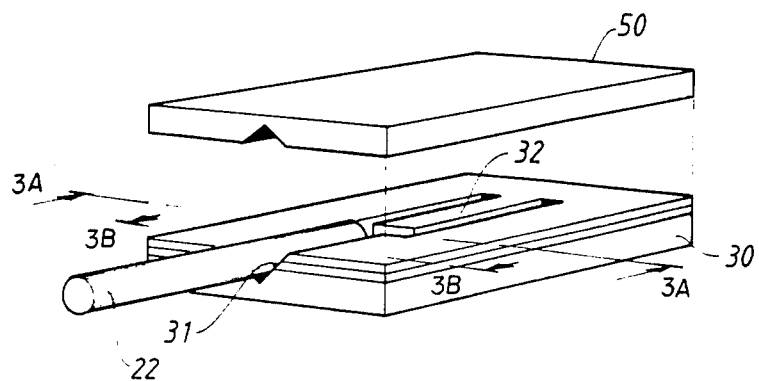

The possibility of having a time constant $\tau$ which is substantially independent of the temperature (the section 11 in FIG. 1A) can be put to use in other embodiments of sensors for other quantities. FIGS. 2, 3 and 4 show position sensors. Referring to FIGS. 2, 2A and 2B, the sensor comprises two adjacently positioned optical wave conductor structures 20, 21, each characterized by its own transmission function of $I(t,\lambda)$ to $I_s(t,\lambda)$. The transmission functions $(\lambda_1,\tau_1)$ and $(\lambda_2,\tau_2)$, respectively, in FIG. 2 have been indicated, where $\lambda_1$ denotes a certain spectral composition of the luminescent light and $\tau_1$ a certain time constant. The layer 26 is a reflective layer. As a detector for the illustrated sensor a device is required by means of which the relative intensity contributions of luminescent light from the two structures 20, 21 can be determined. Such a detector device is disclosed in Swedish Patent Application No. 8202093-4.

The wave conductor structures 20, 21 shown in FIG. 2 define a beam structure, which can be bent elastically under the influence of a force 23, whereby the optical coupling between a fiber 22 and the structures 20, 21 is influenced by their mutual positions. FIG. 2A shows the case where equal exposed areas of 20 and 21 are feeding radiation into the end of the fiber 22, while FIG. 2B shows the case where, due to downward deflection of the beam structure, a greater proportion of the light from conductor structure 20 and a smaller proportion of the light from the structure 21, enters the fiber 22.

Thus, determining the quotient between the luminescence intensities from the regions 20 and 21 apparent in the light returning along the fiber 22 gives a measure of the force 23. The force 23 is influenced by a transmission device 24 which can be acted upon by the quantity to be measured. For making a pressure measurement, the device 24 may be a diaphragm. For making a vibration measurement the device 24 may be a mass. Measurement of liquid level and liquid flow can also be effected via a pressure measurement using the equipment shown.

FIGS. 3 and 4 show further embodiments of position sensors based on the construction shown in FIG. 2. The wave conductor layers 20, 21 are in FIG. 3 applied on a substrate material 30, which, for example, is a monocrystalline silicon structure. An established technology exists for manufacturing three-dimensional structures of single crystal silicon which is based on photolithography and etching.

Figure 3A:
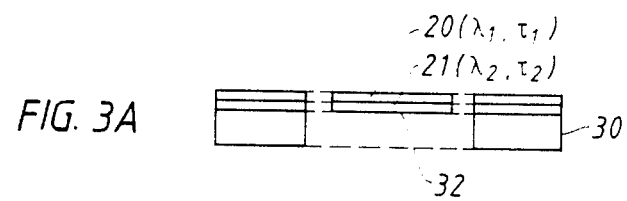
Figure 3B:
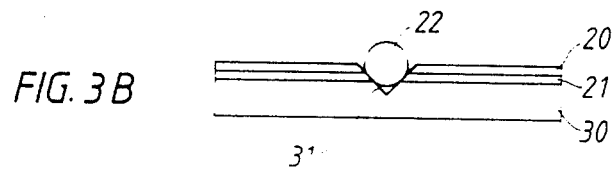

FIG. 3A is a section on the line A—A of FIG. 3 and FIG. 3B a section on the line B—B. A V-groove 31 is etched in the layers 20 and 21 and the substrate material 30 to accommodate the fiber 22 and a beam 32 is formed (see FIG. 3A) by the etching process. The layers 20, 21 can be formed by c.v.d. (chemical vapor deposition) methods, by screen printing methods or by a combination thereof, and consist of a solid solution of atomically localized luminescence centers in a monocrystalline bonding material. A cover plate 50 can be provided and this can incorporate the device 24.

FIGS. 4 and 4A show a modified sensor in which the layers 20 and 21 are supported on a diaphragm 33 (e.g. formed by etching) created from the substrate material 30.

Figure 5:
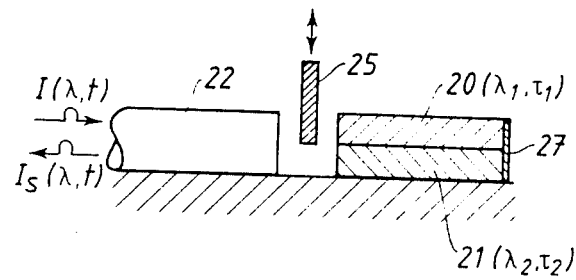

FIG. 5 shows another embodiment of a position sensor. In this embodiment the regions 20, 21 are fixed in relation to the optical fiber 22; but a movable body 25 is disposed between the regions 20, 21 and the fiber 22 to partially screen off the end of the fiber 22 from the regions 20, 21. In this way changes in the relative positions of the body 25 and the fiber 22 cause a change in the relative intensity contributions of luminescent light received from the regions 20, 21. In this case, as in FIG. 2, the regions 20, 21 have reflective coatings 27 to avoid losses through the remote end surfaces.

Figure 6:
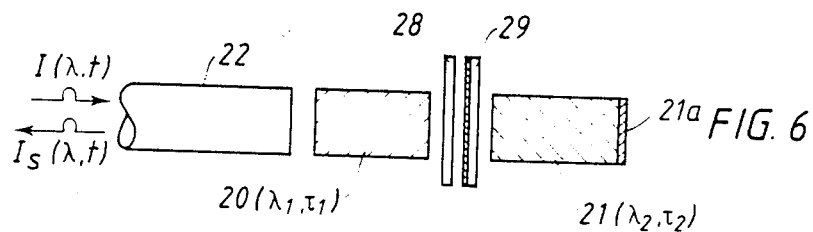

FIG. 6 shows an embodiment which is suitable for measuring electric fields, magnetic fields and mechanical deformation. As in FIGS. 2 to 5, the device of FIG. 6 utilizes luminescent bodies 20, 21; in this case the absorption in the body 20, through a choice of concentration and geometrical shape (length), is so low that excitation light of sufficient intensity passes through the body 20 for excitation of the body 21. Plates 28, 29 having polarizing properties; the polarization rotation in the plate 29 being influenced by the quantity to be measured. For measuring electric fields, the Pockels effect can be utilized, for measuring magnetic fields the Faraday effect can be utilized, and for measuring mechanical deformation the elasto-optical effect can be utilized. A reflecting coating 21a on the body 21 can also be given polarization-rotating properties. In the embodiment, the luminescent light from the body 20 is essentially uninfluenced by the quantity being measured, because the coating 21a is formed as an interference filter which transmits $I(\tau,t)$ and reflects $I_s(\tau_2,t)$ and therefore serves as a reference, whereas the luminescent light from the body 21, which is coupled to the fiber 22, is dependent on the polarization rotation in the plate 29 and thus on the quantity being measured.

Figure 7:
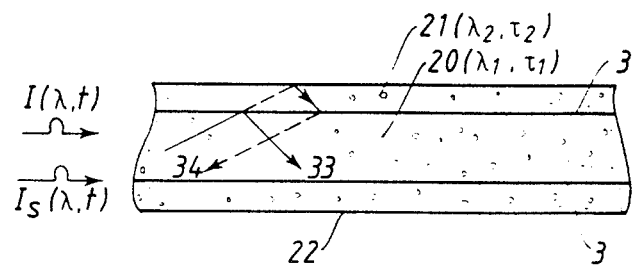
Figure 7A:
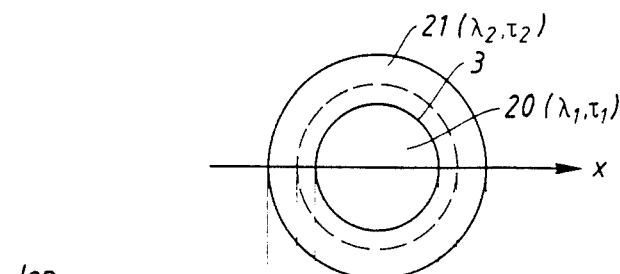
FIG. 7A shows a possible concentration gradient of luminescent centers across the cross-section of a fiber-like sensor.

FIGS. 7 and 7A show a further fiber-shaped sensor, this time a threshold value sensor for temperature monitoring over a larger area, defined by the extension of the sensor fiber. The regions 20, 21 are here geometrically shaped as the core and the sheath, respectively, in an optical fiber (as in FIG. 1) but with low ion concentration (e.g. the region 11 in FIG. 1A). The bonding materials in the regions 20, 21 have been chosen so that, below a certain threshold temperature, total internal reflection takes place at the boundary surface(s) 3. The temperature coefficients of the refractive indices of the core 20 and the sheath 21 are so chosen that, above the threshold temperature, light is conducted into the region 21, which means that luminescence characterized by the transmission function ($\lambda_2, \tau_2$) can then be detected (ray 34).

It may be advantageous to deplete the region nearest to the boundary surface(s) 3 of luminescent ions to avoid excitation from the evanescent wave in the sheath at temperatures below the threshold temperature. FIG. 7A shows this, the graph showing the ion concentration as a function of transverse distance X across the fiber. If $\tau_1$ and $\tau_2$ are of the order of magnitude of nanoseconds, it is also possible to obtain information about the position along a fiber length, where the threshold temperature has been exceeded. Determination of position can then be carried out according to known pulse-echo techniques.

Figure 8A:
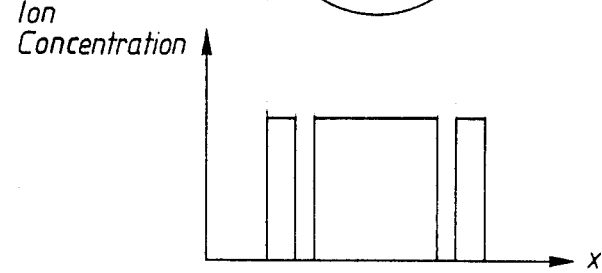
FIGS. 8A, 8B and 8C show possible modes of connecting a fiber end to a sensor according to the invention.
Figure 8A:
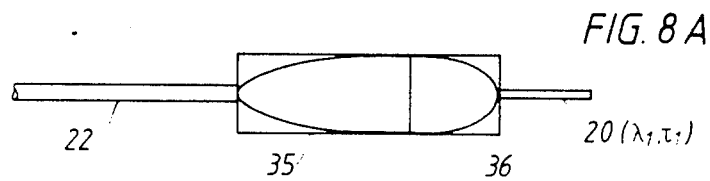
Figure 8B:
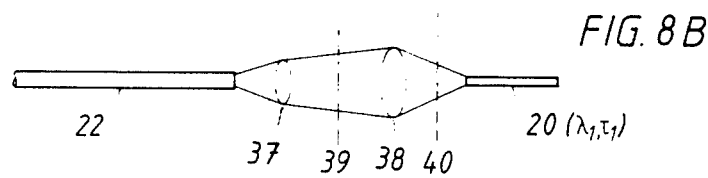
Figure 8C:
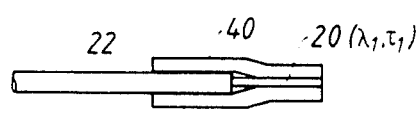

In all the embodiments described, the optical and mechanical connections between the fiber 22 and the regions 20, 21 are of importance for the performance of the sensor. FIGS. 8A, 8B and 8C show a few examples of this.

In FIG. 8A, so-called Selfoc GRIN lenses 35, 36 have been used to increase the numerical aperture of the connection. This is also possible by using classical lenses 37, 38, as shown in FIG. 8B. A connection at the section 39 is relatively insensitive to position tolerances but sensitive to angular deviations; however the reverse is true at the section 40.

FIG. 8C, finally, shows an embodiment of a connection as well as an enclosure, in which a tube 41, for example of glass, has been shrunk over the fiber 22 as well as the wave conductor 20. The tube 41 may constitute sheath material of the fiber 22 (region 4 in FIG. 1 or 21 in FIG. 7).

The improved luminescent material employed in the devices described above would normally be formed by melting together the constituent substances required for the solid solution in a furnace at a temperature of 800°–2000° C. depending on the actual composition used. In the case of monocrystalline bonding materials, the molten material must be cooled extremely slowly and rates of the order of 1° C. per hour are not unusual. In the case of luminescent centers in a bonding material of a glass, the cooling rate is less critical and appreciably faster rates than 1° C. per hour can be employed.

The concentration of luminescent ions in the solid solution is typically of the order of 1 percent by weight. The upper limit is normally set by a phenomenon known as concentration quenching, where the quantum efficiency of the luminescence deteriorates as the concentration of luminescent ions increases. The upper limit can, however, vary from one material to another. Some crystalline materials can still operate satisfactorily at concentrations of the order of 10–20 percent. The lowest usable concentration is determined by the geometric dimension of the sensor. If the ion center concentration is very low, the absorption coefficient will also be low, requiring a greater length of sensor material in the optical path of the exciting radiation.

The sensors described above can be varied in many ways within the scope of the following claims.

What is claimed is:

1. An optical sensor for detecting a change in a physical quantity, said optical sensor comprising two spaced apart bodies, each of said two bodies comprising a solid, substantially optically transparent bonding material which is in the shape of an optical wave conductor and which contains at least 1% by weight of a luminescent material in the form of localized luminescent centers in solid solution, the luminescent materials in said two bodies being different such that the luminescent light emitted from each when excited by light from a common light source will have different optical properties, said two bodies being physically separated but close enough to one another that excitation light from a first of said two bodies can be received by the second of said two bodies and luminescent light from the second of said two bodies can be received by the first of said two bodies.

2. The optical sensor according to claim 1, wherein the localized luminescent centers contained in each of said two bodies are in the form of ions.

3. The optical sensor according to claim 2, wherein said ions consist of rare earth metal ions.

4. The optical sensor according to claim 1, wherein said bonding material is electrically insulating and wherein it includes at least one oxide of a metal selected from the group consisting of silicon, boron, germanium and phosphorus.

5. The optical sensor according to claim 1, wherein the bonding materials and luminescent materials therein used in making each of the two bodies are such that the luminescent light emitted thereby is independent of the temperature to which they are subjected over a predetermined temperature range.

6. The optical sensor according to claim 1, wherein the bonding materials and luminescent materials therein used in making each of the two bodies are such that the luminescent light emitted thereby varies with a change in the temperature to which they are subjected over a predetermined temperature range.

7. The optical sensor according to claim 1, including a fiber for transmitting excitation light to the first of said two bodies and to receive luminescent light emitted from the first of said two bodies.

* * * * *